July 8, 1952 W. R. MANN 2,602,261
MINNOW TRAP
Filed May 6, 1949
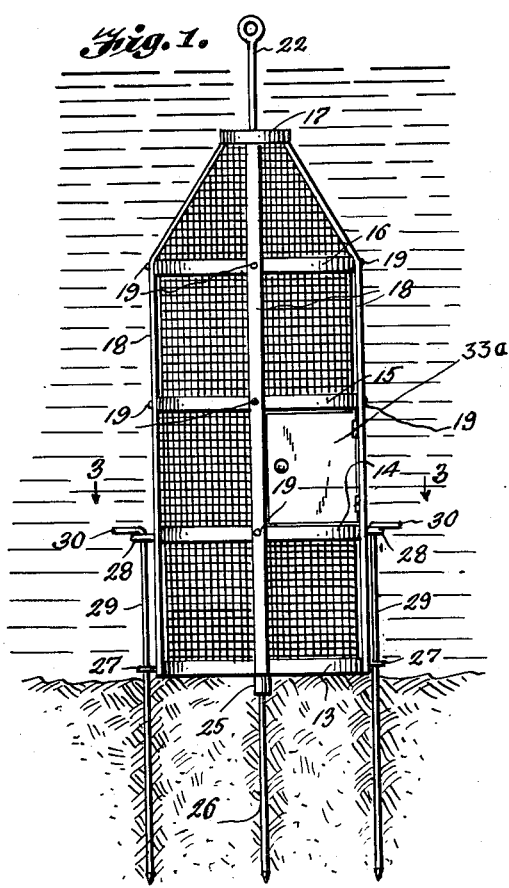
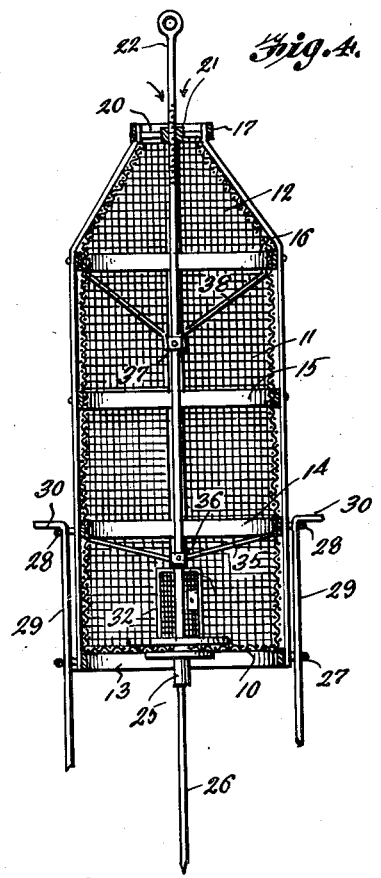
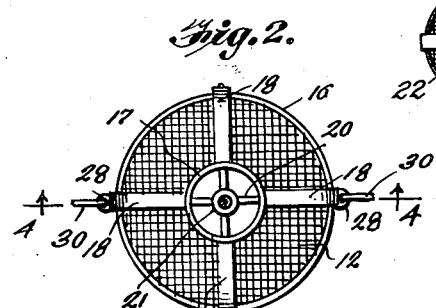
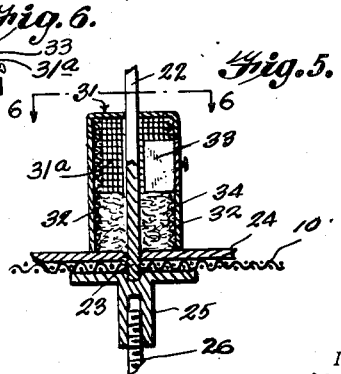
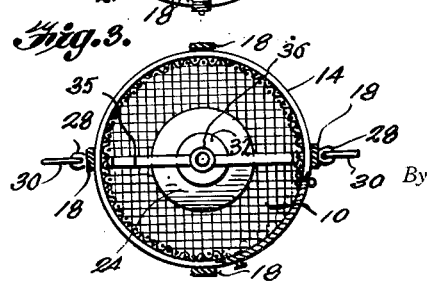
Inventor
WALTER R. MANN
By Patrick D. Beavers
Attorney Patented July 8, 1952

2,602,261

UNITED STATES PATENT OFFICE 2,602,261

MINNOW TRAP

Walter R. Mann, Goodlett, Tex.

Application May 6, 1949, Serial No. 91,806

1 Claim. (Cl. 43—102)

The present invention relates to minnow traps and it consists in the combinations, constructions and arrangements of parts herein described and claimed.

Generally there is provided a minnow trap which is of generally cylindrical construction and which is provided with a narrowed upper end through which an opening is provided for the entrance of minnows. The walls of the device are formed of screening material and a novel frame and bracing means is also provided. In the lower end of the device there is mounted centrally a bait holder likewise having its walls formed of screening material to prevent the minnows from feeding upon the bait. The lower end of the device is provided with novel anchors whereby the same may be firmly attached to the bottom of a stream or other body of water.

It is accordingly an object of the invention to provide a device of the character set forth which is simple in construction and inexpensive to manufacture.

Another object of the invention is the provision, in a device of the character set forth, of novel means for anchoring the same to the bed of a stream or the like.

Another object of the invention is the provision of a novel bait enclosure forming a part of the invention.

A further object of the invention is the provision of a novel wall structure for a device of the character set forth.

Other and further objects of the invention will become apparent from a reading of the following specification taken in conjunction with the drawing, in which:

Figure 1 is an elevational view of an embodiment of the invention,

Figure 2 is a top plan view thereof,

Figure 3 is a sectional view taken along line 3—3 of Figure 1,

Figure 4 is a view partly in section taken along line 4—4 of Figure 2,

Figure 5 is an enlarged fragmentary sectional view disclosing certain details of construction, and Figure 6 is a section taken on line 6—6 of Figure 5, showing only the bait holder.

Referring more particularly to the drawing, there is shown therein a minnow trap having a bottom wall 10 of screen material, a main body 11 likewise of screen material and an upwardly and inwardly extending top portion 12 likewise formed of screen material. A door 33a is provided to afford access to the interior of the trap.

The bottom 10 and the lower edge of the body 11 are affixed to a bottom ring 13 and rings 14, 15 and 16 are spaced upwardly from the bottom ring 13 upon the outer side of the body 11. The relatively smaller ring 17 is mounted at the upper extremity of the tapered portion 12.

Four spaced vertically extending straps 18 interconnect the ring 17 with the bottom ring 13 and are affixed by means of rivets 19 or the like at all their points of juncture with the rings 14, 15 and 16 as well as to the body 11 of screening material.

A spider 20 is mounted within the ring 17 and includes a centrally disposed hub or collar 21 in which is threaded an elongated rod 22 which extends from a point upwardly of the ring 17 and thence vertically downwardly through the center of the bottom 10 to form a threaded lower terminus 23. A plate 24 is welded to the rod 22 adjacent its lower end and is adapted to bear against the upper side of the bottom 10.

A flanged coupling 25 is threadably connected to the terminus 23 and has threadably connected to the bottom thereof a downwardly extending spike 26.

The bottom ring 13 is provided with a pair of outwardly extending eyes 27 and the ring 14 is likewise provided with a pair of outwardly extending eyes 28 which lie immediately above the eyes 27 and an anchor member 29 extends downwardly through each of the eyes 28 and 27 and each anchor member is provided at its upper end with an integrally formed outwardly extending handle 30.

Centrally disposed upon the plate 24 and surrounding the rod 22 is a bait holder generally referred to by numeral 31 having a body of screening material 31a. The said bait holder is provided with four upwardly and inwardly extending strap members 32 enclosing same and a door 33 for loading bait 34 into the interior thereof.

Four brace members 35 interconnect a collar 36 mounted upon the rod 22 immediately above the bait holder 31 and the inner side of the ring 14. A collar 37 is affixed to the rod 22 and four brace rods 38 interconnect the same in spaced relation with the inner side of the ring 16.

In operation, it will be apparent that the device may be easily and quickly submerged in a stream or other body of water by manipulating the upper end of the rod 22 to force the same downwardly and thus cause the spike 26 to be imbedded in the bed of the body of water and that thereafter the anchor members 29 may be forced downwardly through the eyes 28 and 27 by pressing upon the handles 30. Minnows will be attracted by the bait 34 in the bait holder 31 and will enter the upper end of the device through the spider 21 but will be prevented from actually devouring the bait due to the fact that the same is fully enclosed within the holder 31. The device may be easily removed from the bed of the body of water by pulling upwardly upon the rod 22 and thereafter the spike 26 and coupling 25 may be removed from the lower end of the rod 22 and the anchors 29 may likewise be removed from the eyes 28 and 27 so that the device may be stored in a minimum of space.

While but one form of the invention has been shown and described herein, it will be readily apparent to those skilled in the art that many minor modifications may be made without departing from the spirit of the invention or the scope of the appended claim.

What is claimed is:

A device of the character described comprising a cylindrical container formed of screen material and having a bottom and a relatively narrow opening in the top thereof, a centrally disposed rod vertically extending from a point above the opening and through said bottom, a spider mounted in said opening supporting said rod, a plate affixed to said rod adjacent the upper face of said bottom, a flange coupling threadably connected to the lower end of said rod, a vertically dependant spike threadably connected with the coupling, a pair of vertically arranged eyes affixed to opposite sides of said container adjacent the lower end thereof and an anchor member vertically slidable in each pair of eyes.

WALTER R. MANN.

REFERENCES CITED

The following references are of record in the file of this patent:

UNITED STATES PATENTS

| Number | Name | Date |
|---|---|---|
| 836,555 | Birnie | Nov. 20, 1906 |
| 962,148 | Jackson | June 21, 1910 |
| 1,228,396 | Bragman et al. | June 5, 1917 |
| 1,357,114 | Perkins | Oct. 26, 1920 |
| 1,357,530 | Smith | Nov. 2, 1920 |
| 1,464,801 | Beers | Aug. 14, 1923 |
| 1,517,502 | Grisson et al. | Dec. 2, 1924 |
| 1,633,982 | Davis | June 28, 1927 |
| 2,372,073 | Flournoy | Mar. 20, 1945 |